United States Patent
Anderson et al.

(10) Patent No.: US 12,028,484 B2
(45) Date of Patent: Jul. 2, 2024

(54) LOCATION-BASED TELEPHONE NUMBER POOL DETERMINATION FOR EMERGENCY CALLS

(71) Applicant: Zoom Video Communications, Inc., San Jose, CA (US)

(72) Inventors: Walter F. C. Anderson, Santa Cruz, CA (US); Vi Dinh Chau, Seattle, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/150,484

(22) Filed: Jan. 5, 2023

(65) Prior Publication Data

US 2023/0144916 A1  May 11, 2023

Related U.S. Application Data

(63) Continuation of application No. 17/390,536, filed on Jul. 30, 2021, now Pat. No. 11,558,507.

(51) Int. Cl.
*H04M 3/51* (2006.01)
*H04M 3/42* (2006.01)

(52) U.S. Cl.
CPC ..... *H04M 3/5116* (2013.01); *H04M 3/42195* (2013.01); *H04M 3/42348* (2013.01); *H04M 2242/04* (2013.01)

(58) Field of Classification Search
None
See application file for complete search history.

(56) References Cited

U.S. PATENT DOCUMENTS

| | | | |
|---|---|---|---|
| 7,127,044 B1 | 10/2006 | Becker et al. | |
| 7,480,374 B2 | 1/2009 | Rollender | |
| 8,208,605 B2 | 6/2012 | Geldenbott et al. | |
| 8,731,144 B2 | 5/2014 | Dillon et al. | |
| 8,737,948 B2 | 5/2014 | Snapp | |
| 8,885,796 B2 | 11/2014 | Geldenbott et al. | |
| 9,198,202 B2 | 11/2015 | Jones | |
| 9,398,148 B1 | 7/2016 | Neuer, III et al. | |
| 9,503,577 B1 | 11/2016 | Bendi et al. | |
| 9,584,661 B2 | 2/2017 | Geldenbott et al. | |
| 9,819,783 B2 | 11/2017 | Bendi et al. | |
| 9,848,310 B1 | 12/2017 | Snapp | |
| 10,225,402 B2 * | 3/2019 | Sterman | H04M 3/5116 |

(Continued)

*Primary Examiner* — Stella L. Woo
(74) *Attorney, Agent, or Firm* — Young Basile Hanlon & MacFarlane, P.C.

(57) ABSTRACT

Location determination and telephone number distribution for emergency calls is enabled by a telephony system which maintains multiple pools of telephone numbers. Each pool corresponds to a different region such that the pools of telephone numbers are defined at the region-level rather than at the site-level. The telephony system determines the location of a calling device initiating an emergency call regardless of whether the calling device is at a known site. Based on the determined location of the calling device, one of the pools of telephone numbers which corresponds to that location is selected. The telephony system thereafter distributes a telephone number for the calling device to use for the emergency call from that selected pool of telephone numbers to facilitate an emergency call between the calling device and a local public safety answering point.

20 Claims, 10 Drawing Sheets

(56) References Cited

U.S. PATENT DOCUMENTS

| | | | |
|---|---|---|---|
| 10,499,232 B1 | 12/2019 | Snapp | |
| 10,708,441 B1* | 7/2020 | Evans | H04M 11/06 |
| 11,558,507 B1* | 1/2023 | Anderson | H04M 3/42195 |
| 2005/0186960 A1 | 8/2005 | Jiang | |
| 2007/0213071 A1 | 9/2007 | Hwang | |
| 2014/0226533 A1* | 8/2014 | Bates | H04M 15/06 |
| | | | 370/259 |
| 2015/0172467 A1 | 6/2015 | Kotin | |
| 2016/0088455 A1 | 3/2016 | Bozik et al. | |
| 2016/0337831 A1 | 11/2016 | Piett et al. | |
| 2017/0295479 A1 | 10/2017 | Artuso | |
| 2018/0020091 A1* | 1/2018 | Self | H04W 4/023 |
| 2018/0124561 A1* | 5/2018 | Hassan | H04W 4/021 |
| 2019/0281408 A1 | 9/2019 | Zhao | |

\* cited by examiner

LOCATION-BASED TELEPHONE NUMBER POOL DETERMINATION FOR EMERGENCY CALLS

CROSS-REFERENCE TO RELATED APPLICATION(S)

This application is a continuation of U.S. application Ser. No. 17/390,536, filed Jul. 30, 2021, the entire disclosure of which is herein incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for location determination and telephone number distribution for emergency calls.

One aspect of this disclosure is a method, which includes determining a location of a calling device responsive to the calling device initiating an emergency call to a public safety answering point (PSAP), determining a pool of telephone numbers associated with the location of the calling device, distributing a telephone number from the pool of telephone numbers to the calling device for use with the emergency call, and facilitating the emergency call between the calling device and the PSAP based on the telephone number.

Another aspect of this disclosure is an apparatus, which includes a memory and a processor configured to execute instructions stored in the memory to select a pool of telephone numbers from a plurality of pools of telephone numbers based on a location of a calling device, and distribute a telephone number from the pool of telephone numbers to the calling device for use with an emergency call between the calling device and a PSAP.

Yet another aspect of this disclosure is a non-transitory computer readable medium storing instructions operable to cause one or more processors to perform operations, which include determining a location of a calling device based on network information within a detectable range of the calling device, selecting a pool of telephone numbers from a plurality of pools of telephone numbers based on the location of a calling device, and facilitating an emergency call between the calling device and a PSAP based on a telephone number from the pool of telephone numbers.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
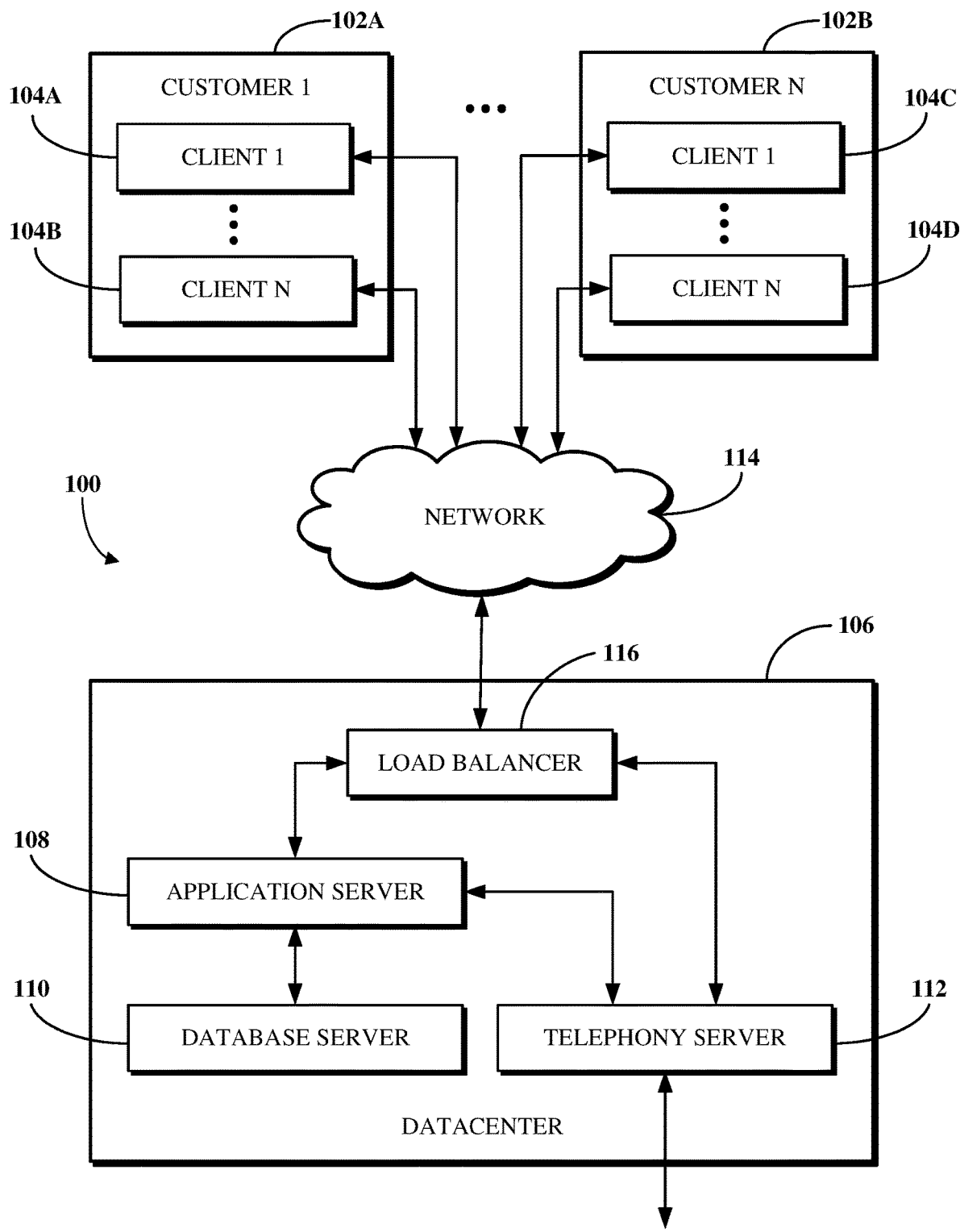
FIG. 1 is a block diagram of an example of an electronic computing and communications system.

Customers of a telephony service provider, which may be an entity operating or otherwise providing a UCaaS platform or a separate telephony service entity, may purchase a number of dedicated telephone numbers for assignment to individual or groups of operators. In many cases, such as where a customer of a telephony service provider has hundreds or thousands of operators, it may be more economical to purchase telephone extensions for many of those operators instead of dedicated telephone numbers. Routing rules may then be defined to enable outbound calls from and inbound calls to those telephone extensions as if they were dedicated telephone numbers.

However, certain telephony service features which are generally available to operators with dedicated telephone numbers may be unavailable to operators with so-called extension-only operators. In particular, because telephone extensions are typically configured for use within a specific geographic region, such as a country or territory, extension-only operators who are roaming in a different region may be unable to use his or her telephone extension to make an emergency call. Given the always increasing rate of international or otherwise inter-regional travel both for work and personal reasons, this may present a significant challenge for extension-only operators in emergency situations.

A conventional approach to addressing this problem is for customers of a telephony service provider to maintain a pool of telephone numbers suitable for emergency call use for their sites. For example, the customer may, through the telephony service provider, arrange for a pool of telephone numbers to be accessible to operators who make emergency calls at one or more specified sites of the customer. Using such an approach, an extension-only operator who is present at a specified site borrows a local telephone number for a temporary period of time to make an emergency call to a local PSAP. Once the emergency call is completed, the telephone number is returned to the pool maintained for the customer site.

However, because this conventional approach uses pools of telephone numbers defined at the site-level, it suffers from a major drawback in that a pool of telephone numbers is only available to callers who are physically at the subject site or sites associated with the pool. The pool of telephone numbers only becomes available to the operator upon his or her location being matched to a location of a specified site associated with the pool. As such, when an operator is at a location other than a specified site when traveling abroad, he or she may very well be unable to make an emergency call, thereby potentially placing the health, safety, and/or life of himself or herself or of another person at risk.

In one example illustrating this problem, a telephony service provider customer has an extension-only operator who travels from a first region for which his or her telephone extension is configured to a second region (e.g., from the United Kingdom, as the first region, to the United States, as the second region, or vice versa). Although that operator can use his or her telephone extension to make an emergency call in the first region, he or she cannot do so in the second region due to different infrastructure requirements and rules for making emergency calls to local PSAPs. When that operator is at an office of the telephony service provider customer, which is a specified site for which the location is known, he or she may borrow a telephone number from a pool of telephone numbers defined for that site to make an emergency call. However, if that operator goes to an unknown location in that second region, such as a restaurant, a friend's house, a client's office, a hotel, a store, or the like, the operator will not be able to borrow a telephone number from a pool to make an emergency call because his or her location is unknown to the system.

Implementations of this disclosure address problems such as these using location determination and telephone number distribution for emergency calls, by which a telephony system which maintains multiple pools of telephone numbers, each pool corresponding to a different region such that the pools of telephone numbers are defined at the region-level rather than at the site-level. The telephony system determines the location of a calling device initiating an emergency call regardless of whether the calling device is at a known site. The telephony system thereafter distributes a telephone number for the calling device to use for the emergency call from a pool of telephone numbers selected based on that location.

The implementations of this disclosure describe using various network information detectable from a calling device to determine the region in which the calling device, and thus the operator of the calling device, is located. For example, information within an internet protocol (IP) space may be used to deduce location information from the network information to determine or approximate a city on the planet at which the calling device is. In some cases, an empirically updated internal record system that maps locations to call information may be used to determine the location of the calling device. Once the location of the calling device is determined, it is used to select one of a plurality of pools of telephone numbers which each correspond to a different region. A telephone number from the pool corresponding to the location of the calling device is distributed to the calling device for use in an emergency call.

To describe some implementations in greater detail, reference is first made to examples of hardware and software structures used to implement a system for location determination and telephone number distribution for emergency calls. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, such as for global routing for multiple datacenters. In some implementations, load balancers can be included both within and outside of the datacenter 106. In some implementations, the load balancer 116 can be omitted.

Figure 2:
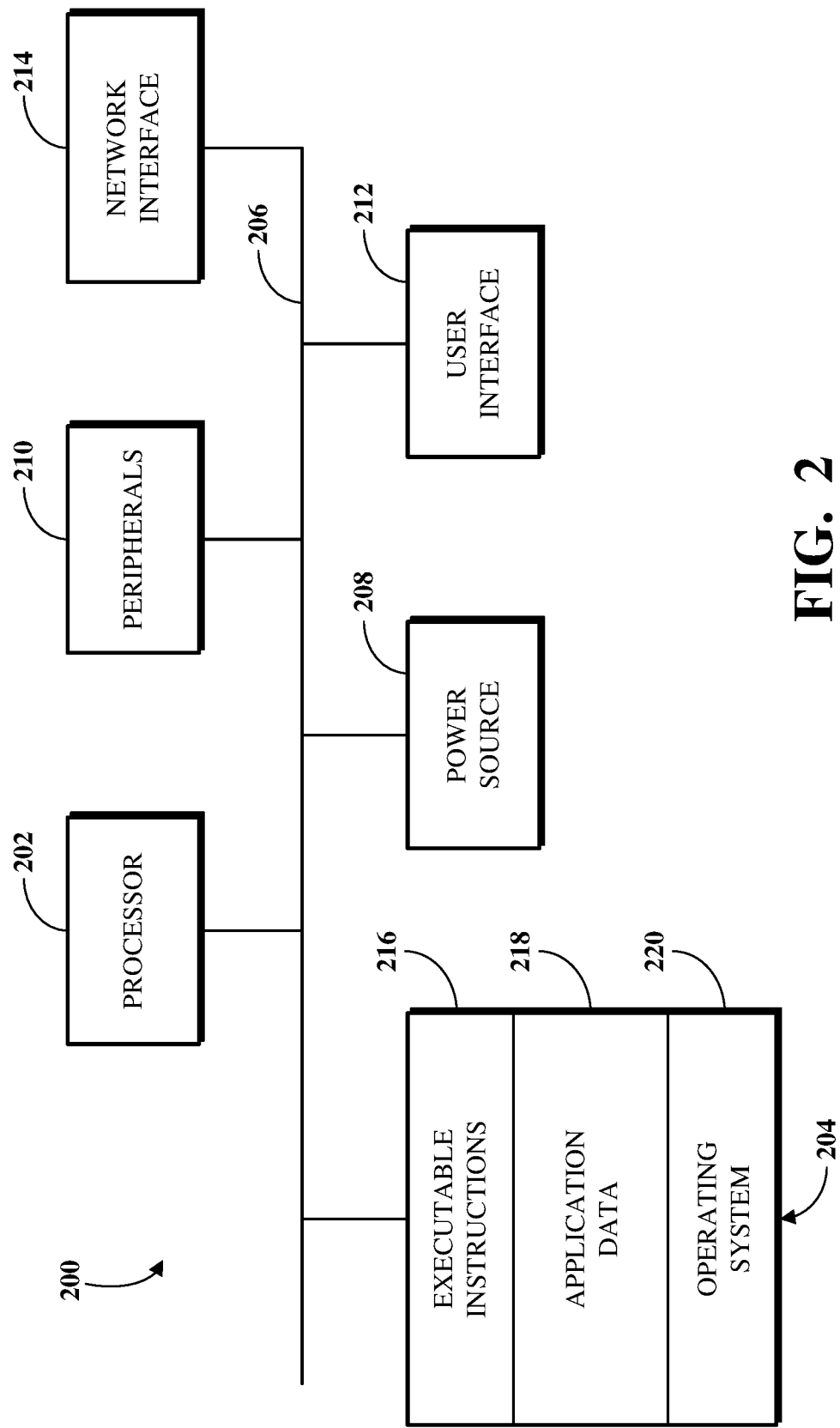
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
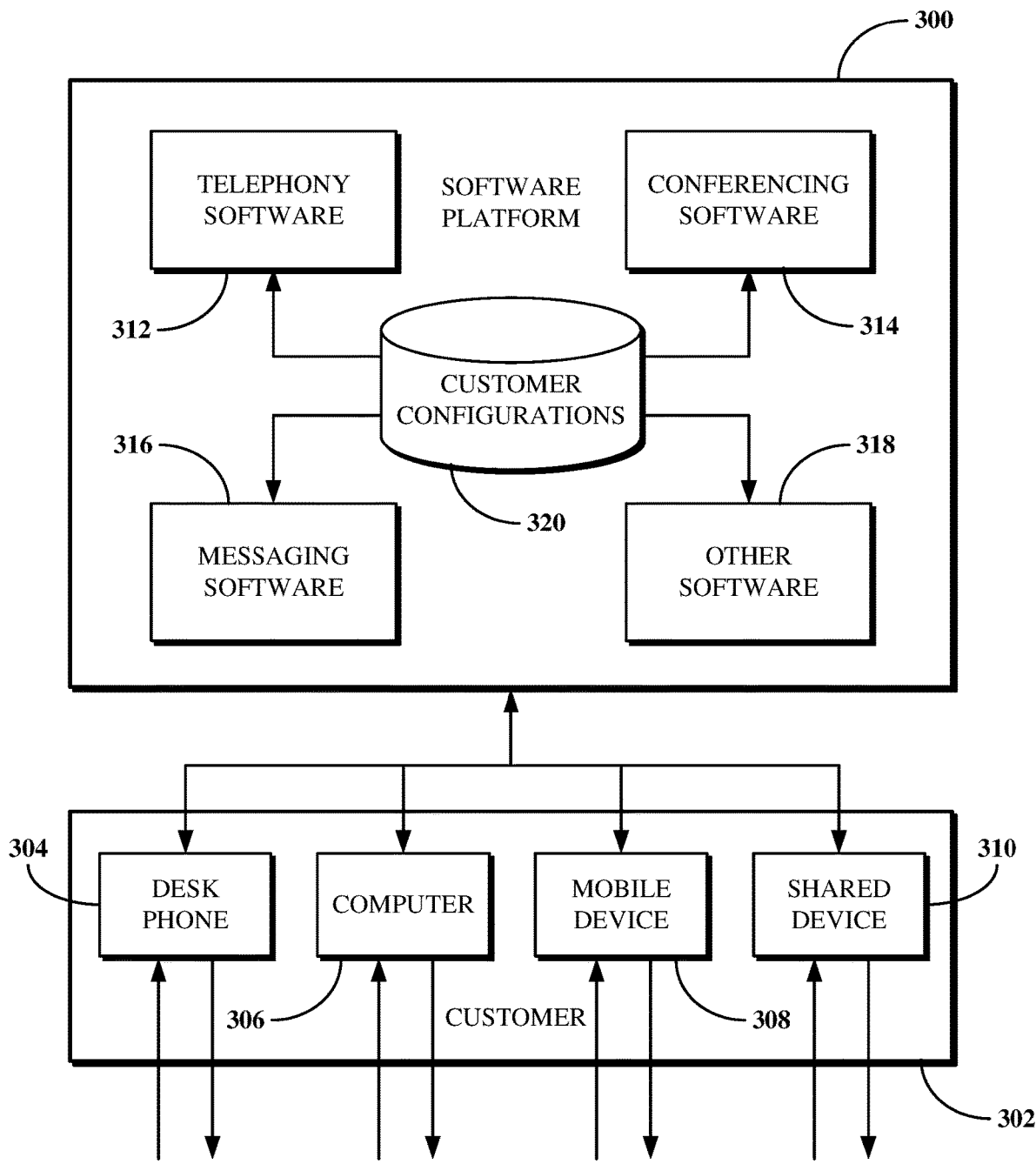
FIG. 3 is a block diagram of an example of a software platform implemented by an electronic computing and communications system.

FIG. 3 is a block diagram of an example of a software platform 300 implemented by an electronic computing and communications system, such as the system 100 shown in FIG. 1. The software platform 300 is a UCaaS platform accessible by clients of a customer of a UCaaS platform provider, such as the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). In some such cases, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include emergency calling software for detecting a location of a calling device and distributing a telephone number from a telephone number pool associated with that determined location to the calling device to facilitate a call between the calling device and a local PSAP.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
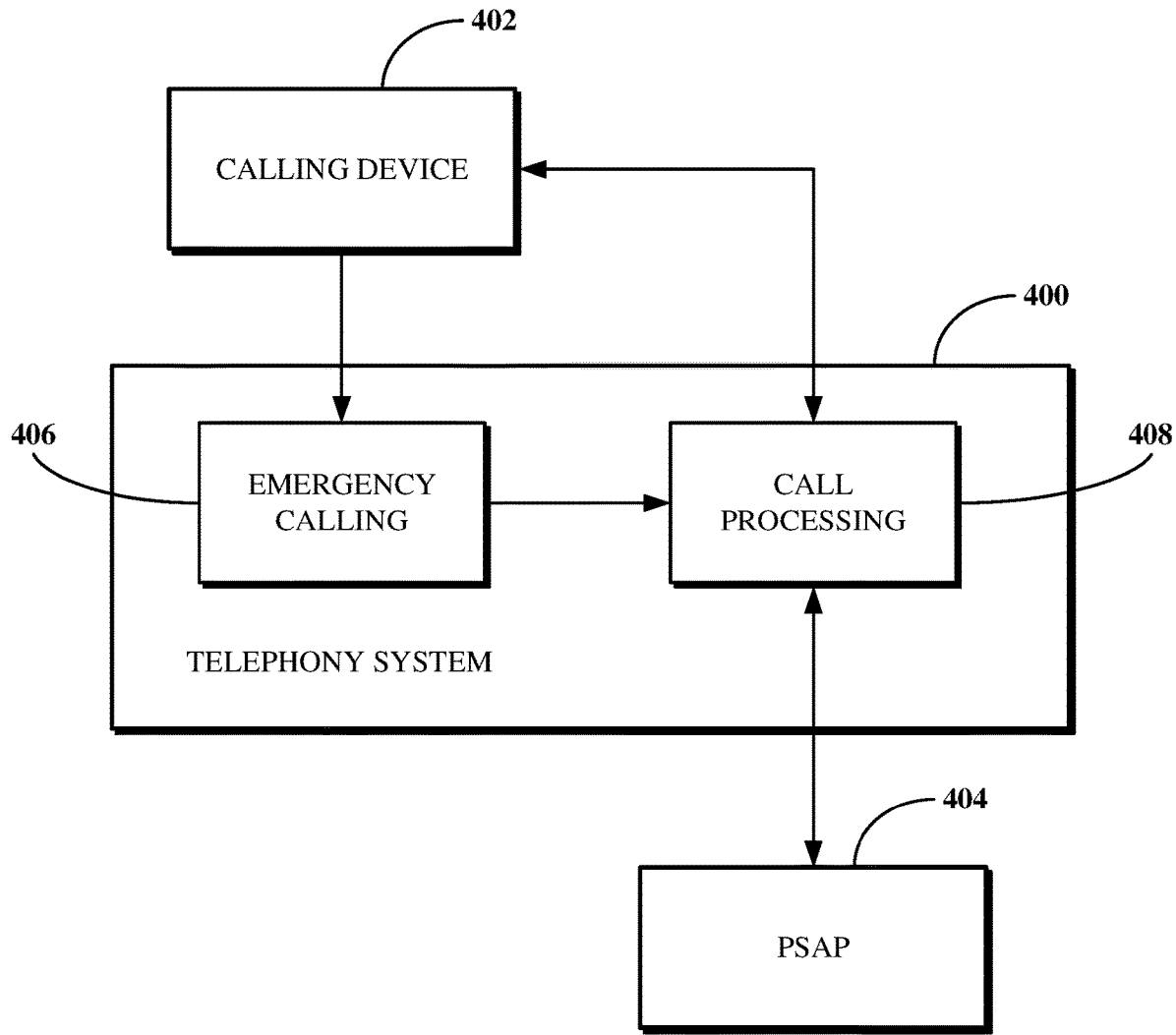
FIG. 4 is a block diagram of an example of a system for location determination and telephone number distribution for emergency calls.

FIG. 4 is a block diagram of an example of a system for location determination and telephone number distribution for emergency calls. The system includes a telephony system 400, which includes hardware and/or software for facilitating telephony communications. For example, the telephony system 400 may be or include the telephony server 112 shown in FIG. 1 and/or may run or implement the telephony software 312 shown in FIG. 3. In particular, the telephony system 400 facilitates inbound calls to and outbound calls from a calling device 402. In a specific example, the telephony system 400 facilitates outbound calls from the calling device 402 to a PSAP 404 and/or inbound calls from the PSAP 404 to the calling device 402.

The calling device 402 is a device configured to make telephone calls, for example, a desk phone device, a mobile phone device, or a device running a softphone. In some implementations, the calling device 402 may be a client device, for example, one of the clients 304 through 310 shown in FIG. 3, which runs a client application. The client application may be client-side software for connecting to services of a UCaaS platform, such as the UCaaS platform 300 shown in FIG. 3.

The PSAP 404 includes representatives who field emergency (e.g., 911 or 111) calls and dispatch emergency responders to the locations of subject emergency events. Agents of the PSAP 404 confirm locations of those emergency events before coordinating with emergency responders. In some cases, where the region in which the PSAP 404 is located supports enhanced emergency service infrastructure such as E911 services, the PSAP 404 may be configured to receive information indicating the location of a device from which an emergency call to the PSAP 404 is placed such as to assist in confirming the location of an emergency event.

The telephony system 400 includes emergency calling software 406 and call processing components 408. The telephony system 400, using the emergency calling software 406 and the call processing components 408, is configured to determine a location of the calling device 402 responsive to the calling device 402 initiating an emergency call to the PSAP 404 and to thereafter facilitate a call between the calling device 402 and the PSAP 404 by distributing a telephone number usable to connect with the PSAP 404 to the calling device 402 based on the determined location of the calling device 402.

In particular, the emergency calling software 406 receives an indication that the calling device 402 has initiated an emergency call process and then determines a location of the calling device 402. The emergency call process may be initiated by an operator of the calling device 402 attempting to dial an emergency number local to the region in which the calling device 402 is located (e.g., 911 for the United States or 111 for New Zealand), in which a client application running at the calling device 402 can detect that the emergency number has been dialed at the calling device 402 and signal information indicative of that detection to the emergency calling software 406. In another example, the operator of the calling device 402 may initiate the emergency call process within the client application itself, in which the client application may signal information indicative of that initiation to the emergency calling software 406.

The emergency calling software 406, responsive to detecting the initiation of the emergency call process, determines the location of the calling device 402. In particular, the emergency calling software 406 determines or approximates a region in which the calling device 402 is located. A region may refer to a country, a territory, or a group of countries or territories (e.g., the United Kingdom, the European Union, North America, or Southeast Asia). The emergency calling software 406, which has access to multiple pools of telephone numbers each corresponding to a different region, then selects one of those pools of telephone numbers based on the determined location of the calling device 402. For example, the emergency calling software 406 may match the region corresponding to the determined location of the calling device 402 with a pool of telephone numbers corresponding to that same region. Once the pool of telephone numbers is selected, the emergency calling software 406 distributes a telephone number from that pool to the calling device 402.

The calling processing components 408 include one or more telephony aspects described with respect to the telephony server 112 shown in FIG. 1, such as telephony aspects of a SIP zone and/or telephony aspects of a web zone, for facilitating calls between endpoints, such as the calling device 402 and the PSAP 404. In particular, once emergency calling software 406 has distributed the telephone number to the calling device 402, the call processing component 408 facilitate a telephone call between the calling device 402 and the PSAP 404 based on that telephone number. In some implementations, the call processing components 408 may facilitate multiple calls between the calling device 402 and the PSAP 404 based on the distributed telephone number, such as after an initial call from the calling device 402 to the PSAP 404.

In some implementations, the emergency calling software 406 or a portion thereof may be run at the calling device 402 rather than at the telephony system 400. For example, a client application running on the calling device 402 may include all or a portion of the emergency calling software 406. In some such implementations, the client application, using the emergency calling software 406 or the portion thereof, may interface with software running at the telephony system 400 to cause a selection of a pool of telephone numbers, cause a distribution of a telephone number from that pool to the calling device 402, and/or cause other operations of the emergency calling software 406 to be performed.

Figure 5:
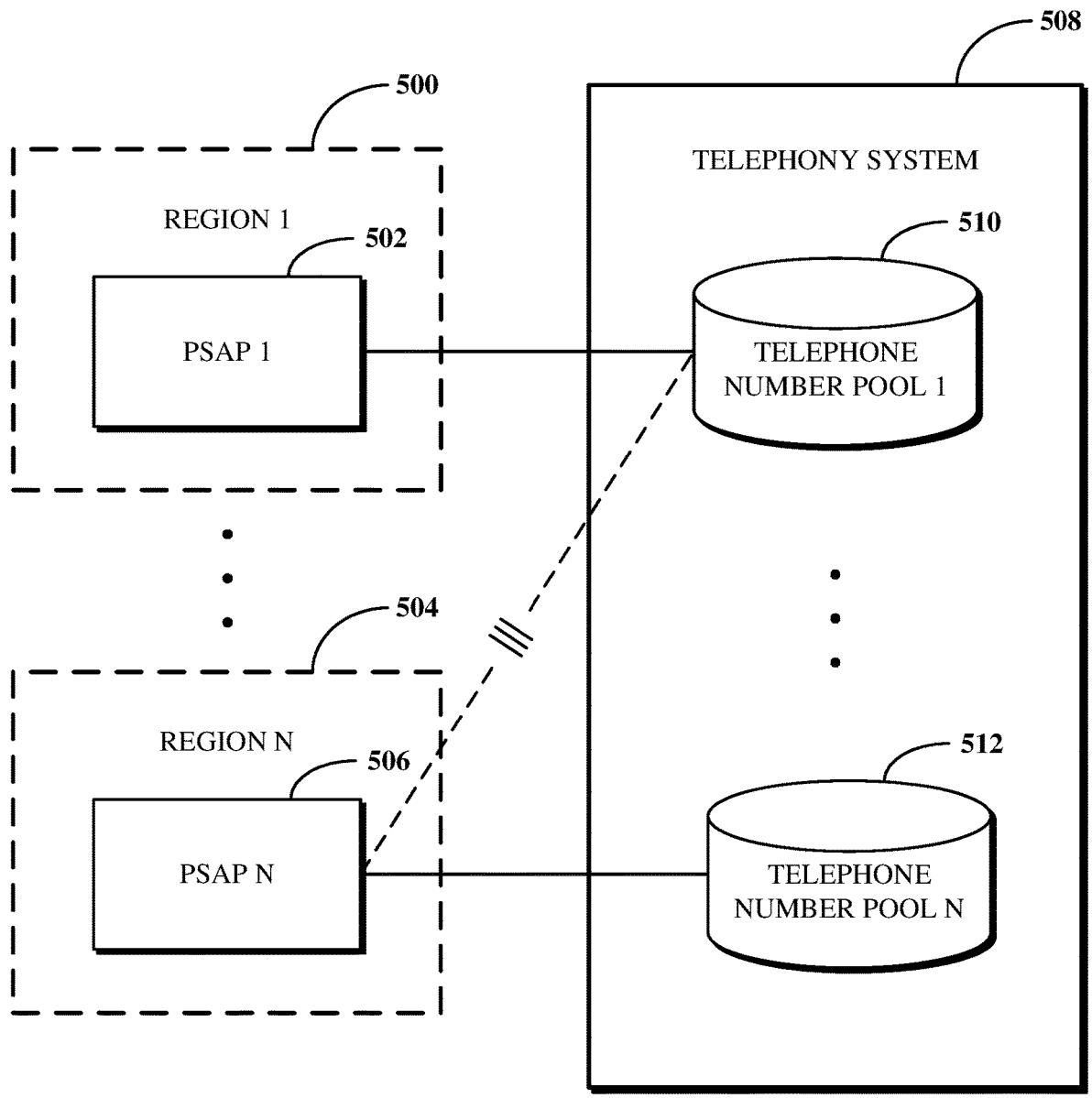
FIG. 5 is a block diagram of examples of telephone number pools associated with different regions.

FIG. 5 is a block diagram of examples of telephone number pools associated with different regions. As described above, a system for location determination and telephone number distribution for emergency calls as disclosed herein includes emergency calling software, for example, the emergency calling software 406 shown in FIG. 4, which determines a location of a calling device, for example, the calling device 402 shown in FIG. 4, from which an emergency call is to be made and distributes a telephone number to that calling device from a pool of telephone numbers corresponding to that determined location of the calling device.

Thus, the location of the calling device is determined to be one of a plurality of potential regions and the pool of telephone numbers is determined to be one of a plurality of pools of telephone numbers. Accordingly, and as illustrated in FIG. 5, the regions within which a calling device may be determined to be located may be one of a region 1 500 which includes a PSAP 1 502 through a region N 504 which includes a PSAP 506, in which the value of N is an integer greater than 1. Although a single PSAP is shown in each of the region 1 500 through the region N 504, there may be other numbers of PSAP in one or more such region.

A telephony system 508, which may, for example, be the telephony system 400 shown in FIG. 4, maintains multiple pools of telephone numbers including a telephone number pool 1 510 through a telephone number pool N 512 in which the value of N again is an integer greater than 1. Each of the telephone number pools 1 510 through N 512 corresponds to one region of the regions 1 500 through N 504. The mappings between ones of the telephone number pools 1 510 through N 512 to ones of the regions 1 500 through N 504 may be defined at or by the telephony system 508. The telephone numbers in a given pool of telephone numbers are usable to make calls, including emergency calls, within the corresponding region.

In the example shown, the telephone number pool 1 510 corresponds to the region 1 500 and the telephone number pool N 512 corresponds to the region N 504. As such, where a calling device is determined to be located in the region 1 500 when the telephony system 508 detects that an emergency call process is being initiated at the calling device, the telephony system 508 will select the telephone number pool 1 510 from amongst the multiple pools of telephone numbers and thereafter distribute a telephone number from the telephone number pool 1 510 to the calling device.

The distribution of telephone numbers from a given pool of telephone numbers to a calling device is temporary to ensure a pool of telephone numbers is not empty for a prolonged period of time. A telephone number distributed to a calling device from a pool of telephone numbers corresponding to a given region may not be used in a different region. For example, as shown by the severed, dashed connection between the PSAP N 506 in the region N 504 and the telephone number pool 1 510, a telephone number distributed from the telephone number pool 1 510 may not be usable to make calls, such as emergency calls, within the region N 504, such as to the PSAP N 506.

Figure 6:
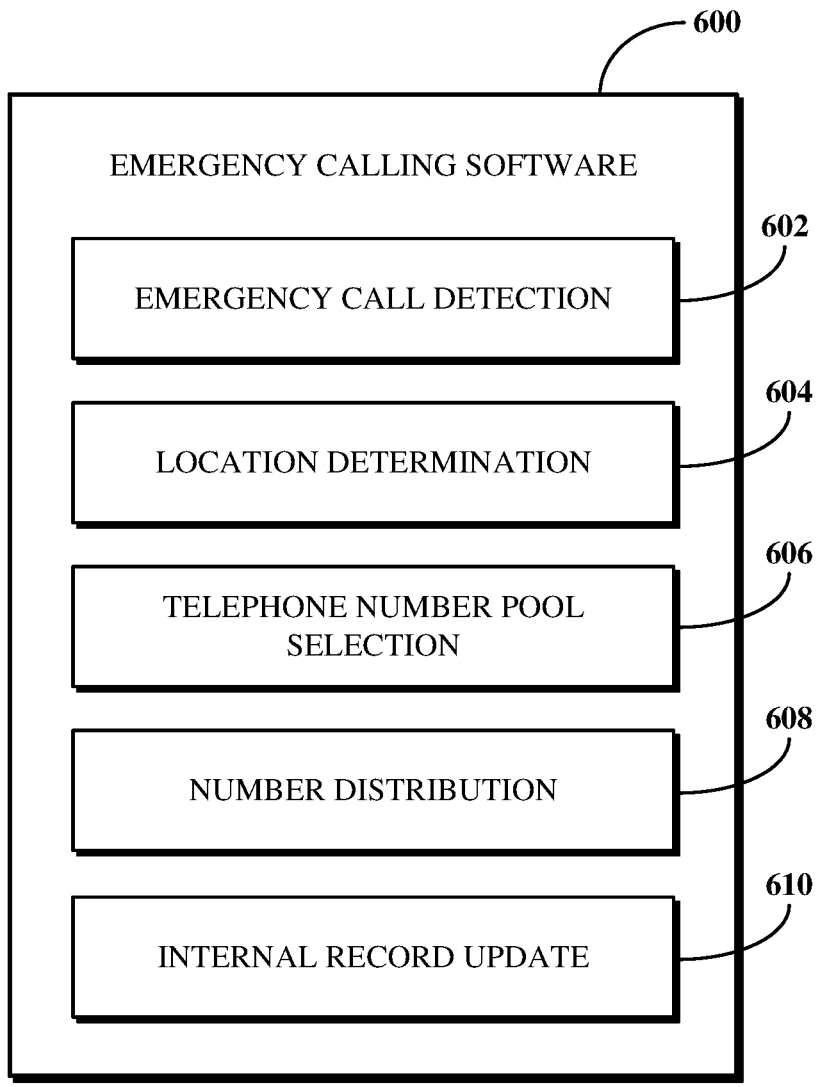
FIG. 6 is a block diagram of example functionality of emergency calling software.

FIG. 6 is a block diagram of example functionality of emergency calling software 600. The emergency calling software 600 may, for example, be the emergency calling software 406 shown in FIG. 4. The emergency calling software 600 includes tools, such as programs, subprograms, functions, routines, subroutines, operations, and/or the like, for detecting a location of a calling device and distributing a telephone number from a telephone number pool associated with that determined location to the calling device to facilitate a call between the calling device and a local PSAP. As shown, the emergency calling software 600 includes an emergency call detection tool 602, a location determination tool 604, a telephone number pool selection tool 606, a number distribution tool 608, and an internal record update tool 610.

The emergency call detection tool 602 detects that an emergency call process has been initiated at a calling device. The emergency call detection tool 602 detects that the emergency call process has been initiated using a client application running at the calling device. For example, the emergency call detection tool 602 may listen to the client application. In another example, the client application may push information to the emergency call detection tool 602. The emergency call process is initiated by an operator of the calling device attempting to dial an emergency number local to the region in which the calling device is located, in which the client application can detect that the emergency number has been dialed at the calling device. In another example, the operator of the calling device 402 may initiate the emergency call process within the client application itself. In either case, the client application can signal an indication of that detection or initiation to the emergency call detection tool 602. Alternatively, in either case, the emergency call detection tool 602 can pull information indicative of that detection or initiation from the client application.

The location determination tool 604 determines a region in which the calling device is located. In particular, the location determination tool 604 determines a region in which the calling device is located in response to the emergency call detection tool 602 detecting that the emergency call process has been initiated at the calling device. The region in which the calling device is located is primarily determined based on a city in which the calling device is located. In some cases, the location determination tool 604 uses geolocation information obtained by the client application accessing a geolocation sensor (e.g., a geospatial positioning system (GPS) component) onboard the calling device to determine a location of the calling device. In some cases, the obtained geolocation information identifies at least a city in which the calling device is located. In other such cases, where the obtained geolocation information does not specify a street address or city information, such as where the geolocation information is expressed in coordinate format, the location determination tool 604 can on its own or using another software aspect use an application programming interface (API) call to a mapping application to obtain the street address or city information associated therewith.

In other cases, whether or not the client application has been granted permission to access the geolocation sensor of the calling device, the location determination tool 604 may determine the location of the calling device based on network information obtained by the calling device. The network information indicates one or more networks within some physical range of the calling device. The one or more networks may include public or private Wi-Fi networks, Bluetooth networks, and/or other networks to which a computing device could connect. The network information may in some cases also identify one or more devices which are connected to the network, such as by a public IP address and/or a subnet or private IP address for operator devices; a MAC address, port label, and/or port range of a network switch; and a basic service set identifier (BSSID) of a wireless access point.

The location determination tool 604 can cross-reference those identified networks and/or devices against an internal record system. The internal record system includes a data store storing records of verifications of addresses and/or other location information associated with networks and/or deices. Where the data store of the internal record system includes an entry corresponding to an identified network or device, an address thereof can be retrieved from the data store. The location determination tool 604, given that the calling device is in a detectable range of the network or device, thus determines the location of the calling device based on the address retrieved from the data store of the internal record system.

Where the data store of the internal record system does not include an entry corresponding to any of the identified networks or devices, the location determination tool 604 may push a new record therein for such a network or device including address information associated with geolocation information obtained from the geolocation component of the calling device. Where geolocation access has not been granted to the client application, the location determination tool 604, either itself or using another software aspect, may use a public API source to query for a location of the calling device and then push a new record within the data store of the internal record system for an identified network or device based on address information associated with that location.

The location determination tool 604 determines the location of the calling device with as much specificity as possible to ensure accuracy. In particular, where it can be determined, the location will be expressed as a street address along with city, state/providence, and country/territory information. In some cases, the location may further be expressed more granularly such as using floor, room, office, and/or other identifiers in a building with a single street address. However, in some cases where a street address cannot be verified using the detected network information and/or internal records, the location may be approximated to a specific city. This is because the location determination tool 604 is used to determine a region within which the calling device is located, in which, as will be described below, the region is used to select a pool of telephone numbers from which to distribute a telephone number suitable for the region to the calling device.

The telephone number pool selection tool 606 selects a pool of telephone numbers from which to distribute a telephone number to the calling device. The telephone number pool selection tool 606 has access to a plurality of pools of telephone numbers maintained by a service provider (e.g., the service provider implementing some or all of the telephony system 400 shown in FIG. 4) in which each of the pools of telephone numbers is associated with a different region. The location determined by the location determination tool 604, whether expressed granularly based on a street address or further detail or on a more macro-level such as based on a city, indicates the region (e.g., the country or territory) in which the calling device is located. Accordingly, the telephone number pool selection tool 606 uses the location information determined by the location determination tool 604 by comparing a region associated therewith against the regions associated with the various pools of telephone numbers until a match is found. The selected pool of telephone numbers is thus the pool of telephone numbers which is associated with the region in which the calling device is determined to be located.

The number distribution tool 608 distributes a telephone number from the selected pool of telephone numbers to the calling device. The telephone number is configured for use in the region associated with the selected pool of telephone numbers. The number distribution tool 608 distributes the telephone number by removing the telephone number from the selected pool of telephone numbers to prevent it from being concurrently used by another device and by pushing a configuration to the calling device to enable the calling device to use the telephone number for one or more calls, such as the emergency call with the PSAP.

The telephone number which is distributed is selected from amongst the telephone numbers of the selected pool of telephone numbers. The number distribution tool 608 may use one or more techniques for selecting the telephone number to distribute. In some cases, the telephone numbers may be ordered in the pool according to a stack or queue structure, in which case the distributed telephone number is selected based on it being the next telephone number in the subject order (e.g., first-in-first-out or first-in-last-out). In some cases, the telephone number is selected at random from amongst the telephone numbers in the pool. Other examples for selecting the telephone number are also possible.

The internal record update tool 610 optionally updates the internal record system which may in some cases be used by the location determination tool 604 to determine the location of the calling device. As described above, the internal record system includes a data store which stores records indicative of location information of known networks and/or devices based on information obtained during one or more emergency call processes with calling devices. Over time, the internal record system becomes large based on new records being generated and stored such that the internal record system may in at least some cases be used to improve the determination of a calling device location and thus enable faster emergency calling using distributed telephone numbers.

However, in some cases, network information previously obtained and stored in a record of the internal record system data store may change or otherwise become out of date. For example, network devices may be moved, networks may be renamed or terminated, devices may be replaced with new devices, and so on. In such a case, outdated network information currently stored in the internal record system should be updated to prevent it from being used to determine the location of a calling device. Accordingly, the internal record update tool 610 may increase the accuracy of the internal record system by using the network information and address information obtained as part of the emergency call process for a calling device to determine whether information stored in a record of the internal record system is incorrect. Upon determining that such a record is incorrect, the internal record update tool 610 may update or delete that record.

In some implementations, the emergency calling software 600 may include other tools in addition to and/or instead of the tools 602 through 610. Although the tools 602 through 610 are shown as functionality of the emergency calling software 600 as a single piece of software, in some implementations, some or all of the tools 602 through 610 may exist outside of the emergency calling software 600 and/or the software platform may exclude the emergency calling software 600 while still including the some or all of tools 602 through 610 in some form elsewhere. For example, in some implementations, some or all of the tools 602 through 610 may be included in a client application running at a calling device, for example, the calling device 402 shown in FIG. 4. In some implementations, one or more of the tools 602 through 610 may be omitted.

Figure 7:
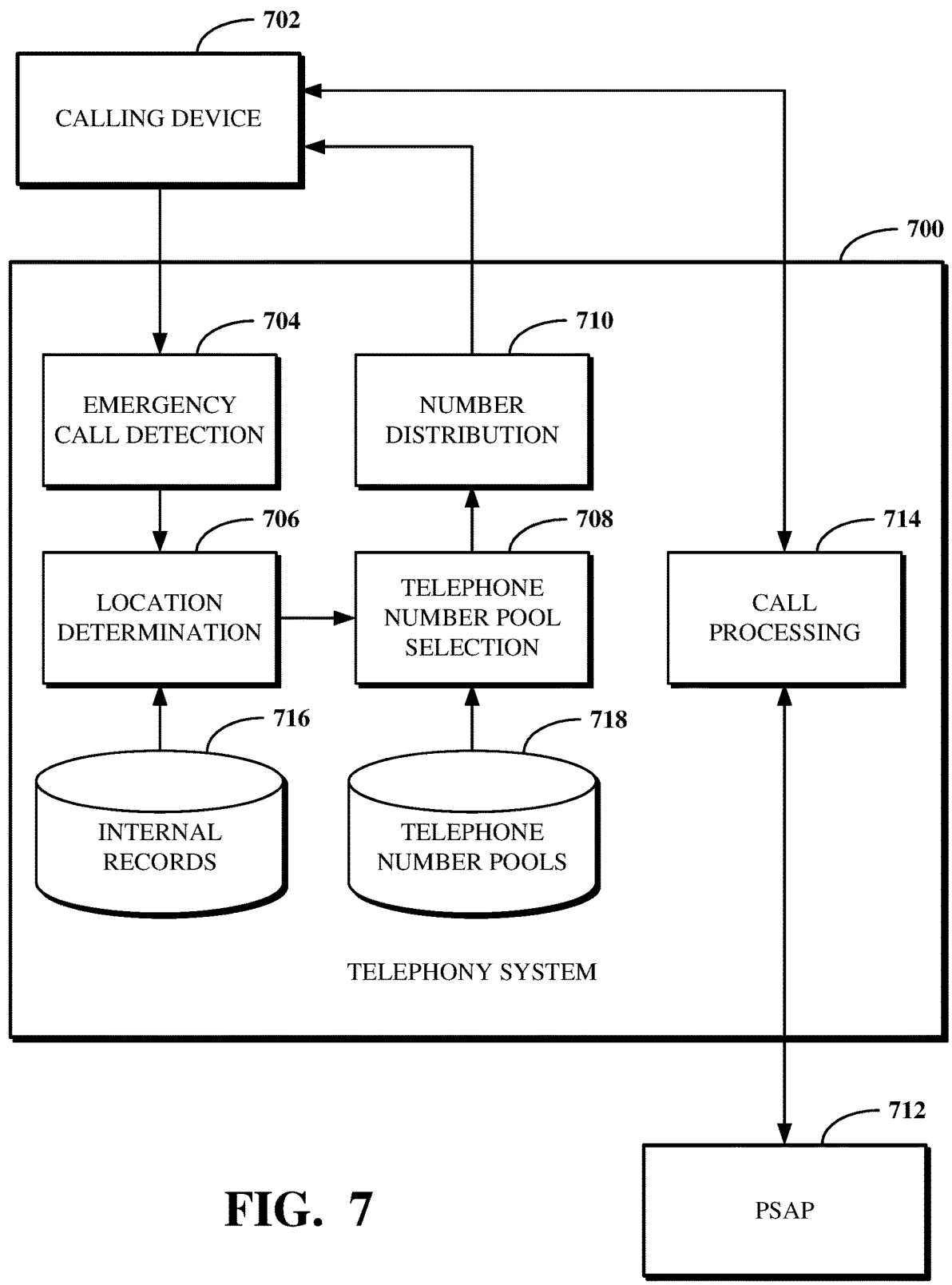
FIG. 7 is a block diagram of an example of a telephony system which determines a location of a calling device and distributes a telephone number to the calling device.

FIG. 7 is a block diagram of an example of a telephony system 700 which determines a location of a calling device 702 and distributes a telephone number to the calling device 702. The telephony system 700 and the calling device 702 may, for example, respectively be the telephony system 400 and the calling device 402 shown in FIG. 4. The telephony system 700 includes various hardware and/or software components for facilitating the determination of the location of the calling device 702 and the distribution of the telephone number to the calling device 702. As shown, the telephony system 700 includes an emergency call detection tool 704, a location determination tool 706, a telephone number pool selection tool 708, and a number distribution tool 710, which may, for example, be the tools 602 through 608 shown in FIG. 6. The telephony system 700 further includes various hardware and/or software components for facilitating a telephone call between the calling device 702 and a PSAP 712, such as call processing components 714, which may, for example, be the call processing components 408 shown in FIG. 4.

The emergency call detection tool 704 detects when an operator of the calling device 702 initiates an emergency call process. In response thereto, the location determination tool 706 determines a location of the calling device 702. For example, the location determination tool 706 may use records 716 stored within a data store of an internal record system to determine the location of the calling device 702. The telephone number pool selection tool 708 thereafter determines a pool of telephone numbers from which a telephone number is to be distributed to the calling device 702 from amongst a plurality of pools of telephone numbers 718 maintained at the telephony system 700, such as by a service provider associated with (e.g., operating) the telephony system 700. Once the pool of telephone numbers is selected based on the location of the calling device 702, the number distribution tool 710 distributes a telephone number from that pool to the calling device 702. The telephony system 700 then, using the call processing components 714, facilitates an emergency call between the calling device 702 and the PSAP 712.

In particular, the emergency call includes an outbound call from the calling device 702 to the PSAP 712 based on the telephone number. However, in some cases, the emergency call may further include an inbound call from the PSAP 712 to the calling device 702 by the PSAP 712 calling back to the telephone number. For example, the PSAP 712 may log the telephone number used by the calling device 702 to call the PSAP 712. In the event an agent at the PSAP 712 needs to reach the operator of the calling device 702, such as to collect further information about an emergency event or for other purposes, the telephony system 700 may facilitate, using the call processing components 714, a call from the PSAP 712 to the calling device 702.

In some implementations, a temporary routing rule may be defined to configure the telephone number for use in making outbound calls from the calling device 702 and/or receiving inbound calls at the calling device 702. For example, the number distribution tool 710 or another tool of the telephony system 700 may generate a temporary routing rule to temporarily link the distributed telephone number with the calling device 702 until the emergency call is concluded. The conclusion of the emergency call may be determined in one or more ways. For example, the operator of the calling device 702 may indicate the conclusion of the emergency call at the calling device 702 in response to a prompt from the telephony system 700. In another example, the conclusion of the emergency call may be inferred based on a threshold period of time (e.g., one hour) which has elapsed since the telephone number was distributed to the calling device 702. In yet another example, the conclusion of the emergency call may be determined based on an event, such as an emergency responder arriving at the scene of the emergency event for which the emergency call process was initiated at the calling device 702.

In some implementations, location information associated with the calling device 702 may be signaled to the PSAP 712 concurrently with or otherwise within the emergency call facilitated by the telephony system 700 between the calling device 702 and the PSAP 712. For example, and based on the region in which the PSAP 712 is located, the PSAP 712 may or may not support enhanced emergency calling services, such as using E911 in the United States. With enhanced emergency calling, location information may be digitally transmitted as part of an emergency call from the calling device 702 to the PSAP 712, either by the calling device 702 integrating that location information within the call or by an intermediary aspect (e.g., the telephony system 700) intercepting the call coming from the calling device 702 and integrating the location information before forwarding it to the SPAP 712.

In another example, where the PSAP 712 does not support such enhanced emergency calling services and the location determination tool 706 determined a street address for the calling device 702, the telephony system 700 can transmit data configured to cause a public database usable by the PSAP 712 to update with the caller ID record associated with the distributed telephone number with that street address information, such as based on an API call while the emergency call is in transit. In this way, the agent at the PSAP 712, upon searching that public database, may identify the updated address information. Alternatively, where the PSAP 712 does not support such enhanced emergency calling services and the location determination tool 706 determined a location but not a specific street address, the telephony system 700 can transmit data configured to cause the public database usable by the PSAP 712 to list information associated with the caller ID record associated with the distributed telephone number saying that the address of record is unknown and to confirm that address with the caller.

Figure 8:
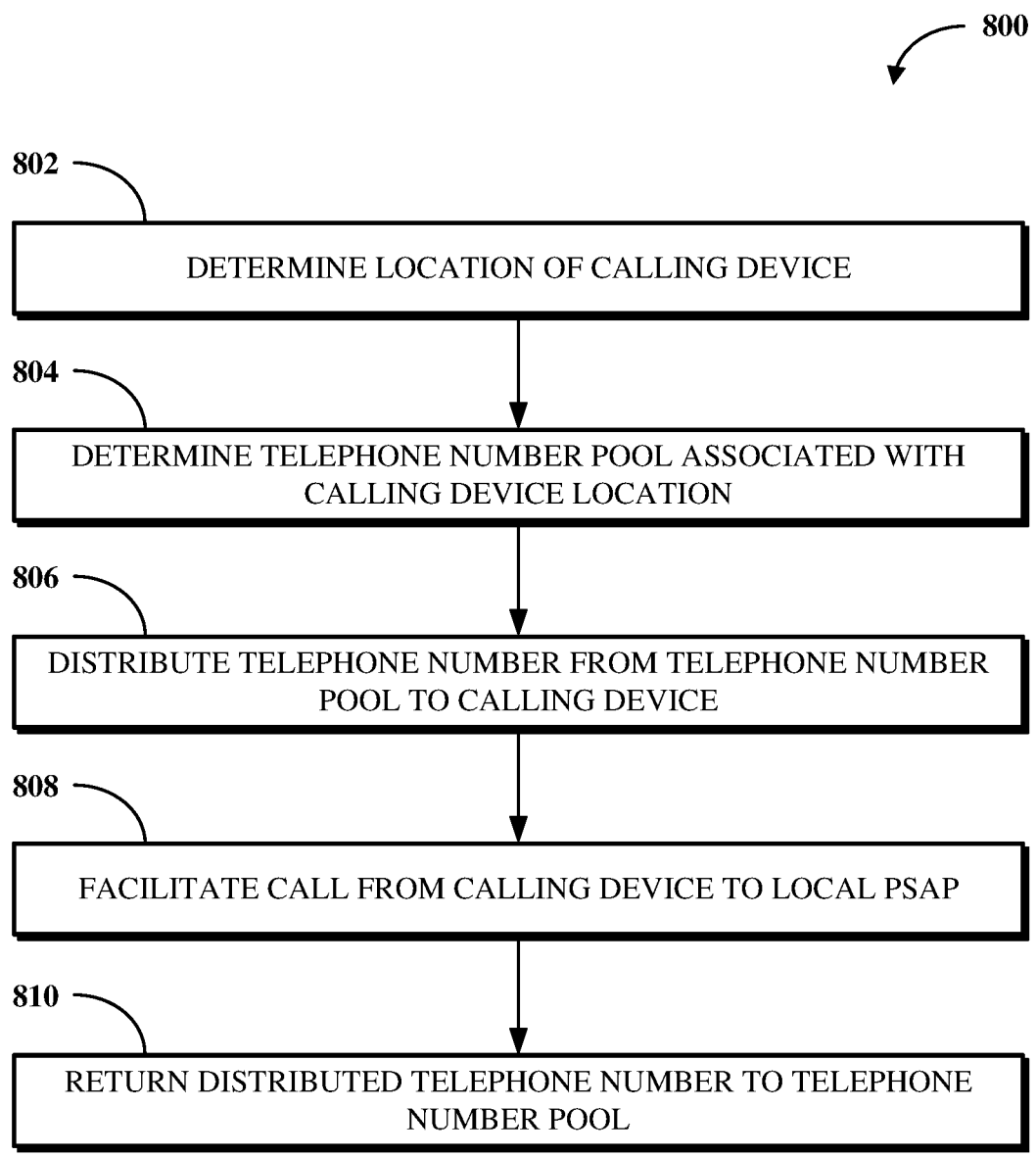
FIG. 8 is a flowchart of an example of a technique for location determination and telephone number distribution for emergency calls.
Figure 9:
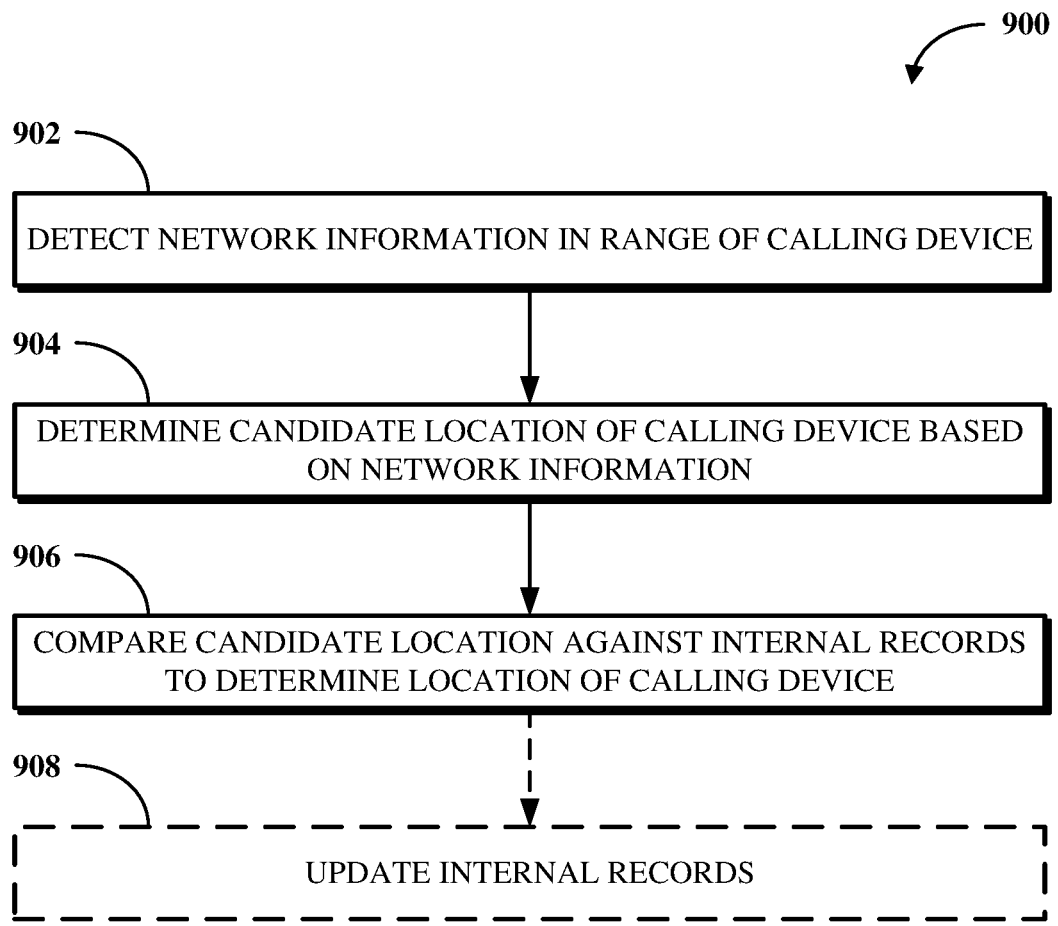
FIG. 9 is a flowchart of an example of a technique for determining a location of a calling device.
Figure 10:
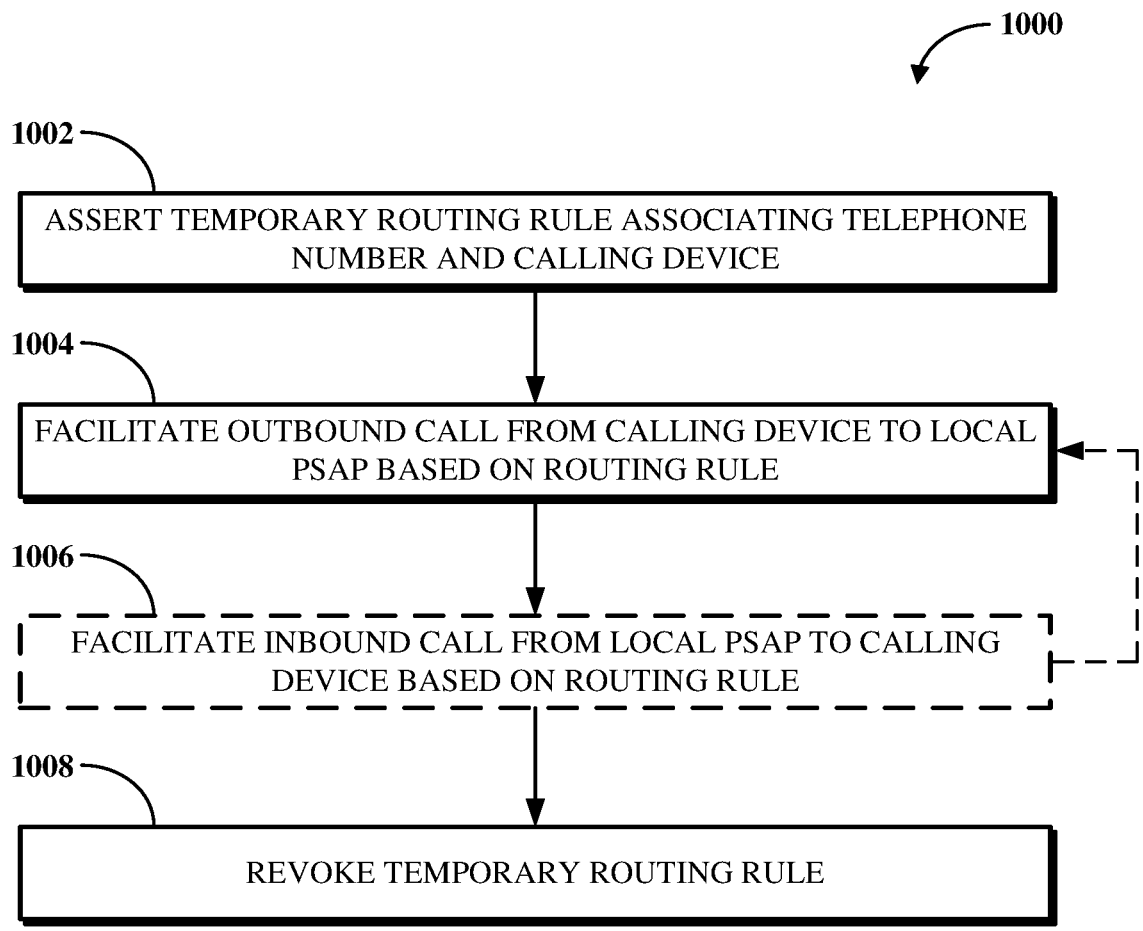
FIG. 10 is a flowchart of an example of a technique for facilitating calls between a calling device and a PSAP.

To further describe some implementations in greater detail, reference is next made to examples of techniques which may be performed by or using a system for location determination and telephone number distribution for emergency calls. FIG. 8 is a flowchart of an example of a technique 800 for location determination and telephone number distribution for emergency calls. FIG. 9 is a flowchart of an example of a technique 900 for determining a location of a calling device. FIG. 10 is a flowchart of an example of a technique 1000 for facilitating calls between a calling device and a PSAP.

The technique 800, the technique 900, and/or the technique 1000 can be executed using computing devices, such as the systems, hardware, and software described with respect to FIGS. 1-7. The technique 800, the technique 900, and/or the technique 1000 can be performed, for example, by executing a machine-readable program or other computer-executable instructions, such as routines, instructions, programs, or other code. The steps, or operations, of the technique 800, the technique 900, and/or the technique 1000 or another technique, method, process, or algorithm described in connection with the implementations disclosed herein can be implemented directly in hardware, firmware, software executed by hardware, circuitry, or a combination thereof.

For simplicity of explanation, the technique 800, the technique 900, and the technique 1000 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 8, the technique 800 for location determination and telephone number distribution for emergency calls is shown. At 802, a location of a calling device is determined. The location of the calling device is determined responsive to an operator of the calling device initiating an emergency call to a PSAP. For example, the initiation of the emergency call can be determined using a client application running at the calling device. Determining the location of the calling device includes determining a candidate location of the calling device based on network information within a detectable range of the calling device and then comparing that candidate location against records of locations within a data store of an internal record system to determine the candidate location is accurate.

At 804, a pool of telephone numbers associated with the location of the calling device is determined. The pool of telephone numbers is one of a plurality of pools of telephone numbers maintained by a telephony service provider. Each pool of telephone numbers of the plurality of pools of telephone numbers is associated with a different region. Determining the pool of telephone numbers associated with the location of the calling device includes selecting the pool of telephone numbers from the plurality of pools of telephone numbers based on a determination that the location of the calling device is associated with a region with which that selected pool is also associated. In particular, the region with which the selected pool of telephone numbers is associated is different from a region associated with a telephone extension configured for use with the calling device. For example, the pool of telephone numbers and the local PSAP to be called may both be associated with a first region and the telephone extension configured for use with the calling device may be associated with a second region.

At 806, a telephone number is distributed from the pool of telephone numbers to the calling device for use with the emergency call. For example, distributing the telephone number from the pool of telephone numbers may include removing the telephone number from the pool of telephone numbers. In another example, distributing the telephone number from the pool of telephone numbers may include indicating an in-use status of the telephone number within a record associated with the pool of telephone numbers. In some implementations, distributing the telephone number to the calling device can include generating and asserting a temporary routing rule associating the telephone number and the calling device for one or more outbound and/or inbound calls associated with the emergency call.

At 808, the emergency call is facilitated between the calling device and a local PSAP based on the telephone number. The emergency call may be or include one or more outbound calls from the calling device to the PSAP and/or one or more inbound calls from the PSAP to the calling device. The emergency call is facilitated using call processing components of a telephony system. Thus, in some cases, the distribution of the telephone number to the calling device for use with the emergency call enables a callback to the calling device from the PSAP based on the telephone number.

In some implementations, such as where the PSAP supports enhanced emergency services, facilitating the emergency call between the calling device and the PSAP based on the telephone number may include associating the location of the calling device with the telephone number to cause the calling device to signal the location of the calling device to the public safety answering point within the emergency call. In some implementations, such as where the PSAP does not support enhanced emergency services, the technique 800 may include updating a local public database accessible by the PSAP to indicate an unknown location of the calling device.

At 810, the distributed telephone number is returned to the pool of telephone numbers from which it was distributed. For example, the distributed telephone number may be returned to the pool of telephone numbers in response to a conclusion of the emergency call.

Referring next to FIG. 9, the technique 900 for determining a location of a calling device is shown. At 902, network information in range of the calling device is detected. The network information may correspond to one or more networks and/or one or more devices within a detectable range of the calling device. The detectable range may be defined as a physical space surrounding the calling device within which the calling device is capable of detecting a network or detecting that a device is connected to a network. The network information may include one or more Wi-Fi networks, one or more Bluetooth networks, and/or one or more other networks detectable by the calling device and/or one or more devices connected to one or more such networks.

At 904, a candidate location of the calling device is determined based on the network information. For example, address information may be determined for one or more of the networks and/or devices associated with the network information. That address information may be expressed as a street address or on a larger scale, such as at the city-level.

At 906, the candidate location is compared against records of an internal record system to determine a location of the calling device. The internal record system includes a data store which stores records indicating locations of various previously identified networks and/or devices. Comparing the candidate location against the records of the internal record system includes searching through the records of the data store for a location matching the candidate location. Upon such a match, the location of the calling device is determined as the location associated with the subject record.

At 908, optionally, one or more records of the internal record system may be updated. For example, responsive to determining that the address of the calling device is different from the address determined based on a record of the internal record system, such as based on input received from the operator of the calling device, a transcription of the emergency call between the calling device and the PSAP, or another source, that record may be updated based on such input to replace the previously stored location information associated with that record.

Referring finally to FIG. 10, the technique 1000 for facilitating calls between a calling device and a PSAP is shown. At 1002, a temporary routing rule associating a distributed telephone number and a calling device is asserted. The temporary routing rule may be generated responsive to or prior to the distribution of the telephone number to the calling device. Asserting the temporary routing rule includes pushing configurations to cause one or more outbound calls from and/or one or more inbound calls to the telephone number to be routed to the calling device.

At 1004, an outbound call from the calling device to a local PSAP is facilitated based on the temporary routing rule. At 1006, optionally, an inbound call from the local PSAP to the calling device may be facilitated based on the temporary routing rule. In some implementations, a further outbound call and/or a further inbound call may also be facilitated between the calling device and the PSAP.

At 1008, the temporary routing rule is revoked. The temporary routing rule is revoked responsive to the telephone number being returned to the pool of telephone numbers. The telephone number is returned to the pool of telephone numbers upon the conclusion of the emergency call between the calling device and the PSAP. Revoking the temporary routing rule includes deleting a record associating the telephone number with the calling device to prevent further inbound calls to or outbound calls from the calling device based on the telephone number without the telephone number being redistributed to the calling device.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    determining a location of a calling device from which an emergency call to a public safety answering point is initiated, wherein the calling device has been configured as an extension-only device in a first region that does not include the location;
    determining, from amongst pools of telephone numbers maintained by a unified communications as a service platform in which each of the pools of telephone numbers is associated with a different region, a pool of telephone numbers associated with a region which includes the location of the calling device; and
    facilitating the emergency call between the calling device and the public safety answering point based on a telephone number from the pool of telephone numbers.

2. The method of claim 1, wherein determining the location of the calling device comprises:
    comparing network information within a detectable range of the calling device against records associating networks with location information.

3. The method of claim 1, comprising:
    determining that a record associated with a network within a detectable range indicates a different location than the location of the calling device; and
    updating the record to replace the different location with the location of the calling device.

4. The method of claim 1, comprising:
    determining that a data store used to determine the location of the calling device omits an entry corresponding to a network within a detectable range of the calling device; and adding a new record associated with the network to the data store.

5. The method of claim 1, wherein the location of the calling device is signaled within the emergency call.

6. The method of claim 1, wherein a local public database accessible by the public safety answering point is updated to indicate an unknown location of the calling device.

7. The method of claim 1, wherein the unified communications as a service platform provides a telephony service used for the emergency call.

8. The method of claim 1, wherein the public safety answering point is unreachable using telephone numbers associated other than with the region.

9. The method of claim 1, wherein facilitating the emergency call includes enabling a callback to the calling device from the public safety answering point according to a temporary routing rule defined based on a distribution of the telephone number to the calling device.

10. The method of claim 1, wherein the telephone number is distributed to the calling device to facilitate the emergency call and returned to the pool of telephone numbers at an end of the emergency call.

11. A non-transitory computer readable medium storing instructions operable to cause one or more processors to perform operations comprising:
determining a location of a calling device from which an emergency call to a public safety answering point is initiated, wherein the calling device has been configured as an extension-only device in a first region that does not include the location;
determining, from amongst pools of telephone numbers maintained by a unified communications as a service platform in which each of the pools of telephone numbers is associated with a different region, a pool of telephone numbers associated with a region which includes the location of the calling device; and
facilitating the emergency call between the calling device and the public safety answering point based on a telephone number from the pool of telephone numbers.

12. The non-transitory computer readable medium of claim 11, wherein the location of the calling device is determined using records associated with network information, wherein the records are maintained by the unified communications as a service platform.

13. The non-transitory computer readable medium of claim 11, wherein the location of the calling device is determined regardless of whether the calling device is at a known site.

14. The non-transitory computer readable medium of claim 11, the operations comprising:
distributing the telephone number from the pool of telephone numbers to the calling device, wherein the telephone number remains distributed for use with the calling device until it is returned to the pool of telephone numbers.

15. An apparatus, comprising:
a memory; and
a processor configured to execute instructions stored in the memory to:
determine a location of a calling device from which an emergency call to a public safety answering point is initiated, wherein the calling device has been configured as an extension-only device in a first region that does not include the location;
determine, from amongst pools of telephone numbers maintained by a unified communications as a service platform in which each of the pools of telephone numbers is associated with a different region, a pool of telephone numbers associated with a region which includes the location of the calling device; and
facilitate the emergency call between the calling device and the public safety answering point based on a telephone number from the pool of telephone numbers.

16. The apparatus of claim 15, wherein the location of the calling device is determined based on networks within a detectable range of the calling device.

17. The apparatus of claim 15, wherein the location of the calling device is determined using records associated with networks, and wherein the processor is configured to execute the instructions to:
update a record associated with a network within a detectable range of the calling device based on the record indicating a different location than the location of the calling device.

18. The apparatus of claim 15, wherein the location of the calling device is determined using records associated with networks, and wherein the processor is configured to execute the instructions to:
store a new record associated with a network within a detectable range of the calling device based on the records omitting the network.

19. The apparatus of claim 15, wherein the processor is configured to execute the instructions to:
update a database accessible by the public safety answering point to indicate an unknown location of the calling device.

20. The apparatus of claim 15, wherein the processor is configured to execute the instructions to:
assert a routing rule to enable the public safety answering point to call the calling device using the telephone number.

* * * * *